(12) United States Patent
Wilkinson

(10) Patent No.: US 6,775,999 B2
(45) Date of Patent: Aug. 17, 2004

(54) SOLAR REFLECTOR FOR HEAT PUMP EVAPORATOR

(76) Inventor: Ken Wilkinson, 3680 Seltise Way, Unit B, Post Falls, ID (US) 83854

( * ) Notice: Subject to any disclaimer, the term of this patent is extended or adjusted under 35 U.S.C. 154(b) by 0 days.

(21) Appl. No.: 09/863,543

(22) Filed: May 22, 2001

(65) Prior Publication Data

US 2002/0174672 A1 Nov. 28, 2002

(51) Int. Cl.[7] .............................. F25B 27/00; F24J 2/12
(52) U.S. Cl. ....................... 62/235.1; 237/2 B; 126/690
(58) Field of Search ............................. 62/235.1, 324.1, 62/259.1; 126/688, 689, 690, 691, 692, 693, 694, 695, 696; 237/2 B

(56) References Cited

U.S. PATENT DOCUMENTS

| | | | | |
|---|---|---|---|---|
| 3,321,012 A | * | 5/1967 | Hervey | 62/235.1 X |
| 4,108,154 A | * | 8/1978 | Nelson | 126/694 X |
| 4,222,368 A | * | 9/1980 | Rost et al. | 126/694 X |
| 4,798,056 A | | 1/1989 | Franklin | 62/235.1 |
| 5,177,977 A | * | 1/1993 | Larsen | 62/235.1 |

* cited by examiner

Primary Examiner—Harry B. Tanner
(74) Attorney, Agent, or Firm—John S. Reid; Reidlaw, L.L.C.

(57) ABSTRACT

A solar reflector for an evaporator in a heat pump system. The evaporator has heat transfer plates and is located in an outdoor environment. The solar reflector has a curved surface configured to reflect solar radiation to the heat transfer plates of the evaporator. The curved surface can be in the shape of a truncated parabola. The curved surface can also be curved in a dish-like shape defining an upper perimeter and a lower perimeter, and the lower perimeter defines a bottom opening configured to receive the evaporator. The solar reflector can also be made of a plurality of partially overlapping curved surfaces configured to reflect solar radiation to the heat transfer plates of the evaporator. In this case the solar reflector includes a hinge ring, and each of the curved surfaces are hingedly attached to the hinge ring. Preferably the hinge ring defines an opening to receive the evaporator.

3 Claims, 6 Drawing Sheets

SOLAR REFLECTOR FOR HEAT PUMP EVAPORATOR

FIELD OF THE INVENTION

The invention claimed and disclosed herein pertains to heat pumps, and more particularly to methods and apparatus to improve the efficiency of an evaporator in a heat pump.

BACKGROUND OF THE INVENTION

A heat pump can be a useful apparatus for heating or cooling an indoor environmental space, such as a home or an office building. The great majority of heat pumps work on an air-to-air-basis. That is, the heat pump moves thermal energy from one mass of air to another mass of air. The two masses of air typically are air in the indoor environmental space, and outdoor atmospheric air. In essence, the heat pump is configured as a reversible refrigeration unit. That is, the heat pump can be operated so as to cool the indoor environmental air, or it can be operated to cool the outdoor environmental air (in which case the thermal energy from the outdoor atmospheric air is transferred to the indoor environmental space, thereby effectively heating the indoor air).

FIG. 1 depicts a prior art refrigeration system 1. This system can be considered as essentially "half" of a heat pump. (A heat pump actually includes two thermal expansion valves versus just the one valve 4 depicted in the figure, as well as a reversing valve to reverse the direction of flow of refrigerant in the system. The simplified system 1 of FIG. 1 is shown for illustrative purposes only.) In FIG. 1, when the heat pump is operating to warm the indoor environmental space (and conversely cool the outdoor atmospheric air), the condenser 3 is located in the indoor space, and the evaporator is located in an outdoor environment. The system 1 circulates a refrigerant in a closed loop, as indicated by the flow direction arrows in the figure. Refrigerant in a vapor form is discharged from the compressor 2 (or "K"), and is directed to the condenser 3. As the refrigerant passes through the condenser, heat is extracted from the refrigerant by passing the indoor air over a series of coils through which the refrigerant passes. As heat $Q_B$ is extracted from the refrigerant (and passed to the indoor environmental space), the refrigerant condenses from a vapor form to a liquid form. The liquid refrigerant then passes through a thermal expansion valve 4 where it flashes from a liquid to a vapor. The heat of vaporization causes a significant drop in the temperature of the refrigerant. The refrigerant is then passed through the evaporator 5, where it absorbs energy $Q_B$ from the outdoor atmospheric air. The evaporator 5 comprises a series of tubing coils through which the refrigerant is passed. The refrigerant coils are typically in thermal energy communication with a series of heat transfer plates (or fins) which provide a larger surface area over which the heat transfer process can occur. The outdoor atmospheric air is forcibly moved over the heat transfer plates by a fan, and thus energy from the outdoor air is transferred to the refrigerant so that it can be subsequently transferred to the indoor air in the manner just described.

FIG. 2 depicts a typical installation for a heat pump evaporator. The setting is a residential house "H". The heat pump evaporator 10 (also known as the outdoor heat exchanger) is typically located proximate to one side of the house. Refrigerant inlet and outlet lines 12 and 14 connect the heat pump evaporator to the other components of the heat pump, which can be located in the house "H". The heat pump is commonly supported by a slab or a platform 11. The evaporator 10 is provided with a fan 16 which causes air to be drawn in from the sides of the evaporator and exhausted from the top of the evaporator. As the air is drawn through the evaporator, it passes over heat transfer plates 18 in the manner described above.

It should be appreciated that when the heat pump is operating to heat the indoor air, the outdoor heat exchanger operates as an evaporator. However, when the heat pump is operated to cool the indoor air, then the outdoor heat exchanger operates as a condenser. Since the present invention pertains to a heat pump operating in a mode to heat indoor air, I will refer to the outdoor heat exchanger as an "evaporator".

Under the right conditions, a heat pump can be a very effective and efficient device for heating (and cooling) an indoor environmental space. However, in locations where the outdoor temperature can be very cold, or where the average temperature in winter months is relatively low, then the heat pump becomes less efficient since the thermal gradient between the refrigerant in the evaporator and the outdoor air can be low. That is, the higher the thermal gradient between the refrigerant in the evaporator and the outdoor air, the more effective the heat pump will be at heating the indoor space.

What is needed then is a heat pump which achieves the benefits to be derived from similar prior art devices, but which avoids the shortcomings and detriments individually associated therewith.

SUMMARY OF THE INVENTION

The present invention provides for methods and apparatus to increase the performance of an evaporator in a heat pump system when the heat pump system is being used to heat an indoor environmental space. The invention allows the performance of the heat pump evaporator to be increased by directing solar radiation to heat transfer plates within the evaporator. Generally, the evaporator is located in an outdoor environment.

A first embodiment of the present invention provides for a solar reflector for the evaporator described in the previous paragraph. The solar reflector includes a curved surface configured to reflect solar radiation to the heat transfer plates of the evaporator. The curved can be in the shape of a truncated parabola. That is, the curved surface is formed like a parabolic dish, but the bottom of the dish is "cut off". This results in an opening in the curved surface which can accommodate the evaporator so that the curved surface can be placed around the evaporator by lowering it over the evaporator from the top. Further, the curved surface can be a dish-like shape (not necessarily parabolic) such that the curved surface defines an upper perimeter and a lower perimeter. The lower perimeter then defines a bottom opening which accommodate the evaporator. In this way the solar reflector can be placed around (at least part of) the evaporator to focus reflected solar radiation towards the heat transfer surfaces of the evaporator. This solar radiation warms the heat transfer surfaces, thus providing more energy which can be used to heat the indoor environmental space.

Since the evaporator can be provided with a refrigerant supply line and a refrigerant return line (as well as an electrical power line), these service lines can interfere with a solar reflector which is configured to completely surround the evaporator. Accordingly, the upper and lower perimeters of the curved surface can be configured to each form a partial circle, rather than a full circle. The "gaps" in each of the perimeters can then be aligned to thusly define a gap in the curved surface. The gap can then receive one of more of the service lines to allow the curved surface to be fit around the evaporator.

Also, in some instances the evaporator is located close to a building or a structure, and so it is not possible to completely surround the evaporator with a dish-type solar reflector. In this case the upper perimeter of the solar reflector can form a partial circle, and the lower perimeter can define three sides of a rectangular opening (or a partial circular opening). The rectangular opening (or the partial circular opening) is configured to receive the evaporator. In this case, rather than drop the solar reflector over the evaporator from the top, the solar reflector can be "slid" into place from the side of the evaporator.

To further improve the performance of the solar reflector, the inner surface (i.e., the surface facing the evaporator) of the curved surface can be a highly reflective surface. For example, the curved surface can be fabricated from metal (such as stainless steel or aluminum), and the inner surface can then be polished to improve the solar reflecting (and focusing) properties of the solar reflector.

Since the solar reflector can be used for existing installations of evaporators, it is desirable to allow the solar reflector to be adjustable to that it can accommodate a variety of different sizes of evaporator. In one variation the solar reflector can have legs to support the curved surface on a horizontal support surface. These legs can be adjustable in height to allow the solar reflector to focus the reflected solar radiation directly on the heat transfer plates in the evaporator.

A second embodiment of the present invention also addresses the issue of allowing the solar reflector to be adjustable to accommodate different configurations of evaporators. In this embodiment the solar reflector comprises a plurality of partially overlapping curved surfaces. Each curved surface is configured to reflect solar radiation to the heat transfer plates of the evaporator. The solar reflector also includes a hinge ring to which each of the curved surfaces are hingedly attached. The hinge ring can define an opening configured to receive the evaporator. Thus, when one curved surface is rotated about the hinge ring, all of the other overlapping surfaces will follow, allowing the curved surface to be spread out or pulled closer together. In this way the curved surface can be adjusted to more effectively focus the reflected solar radiation on the heat transfer plates (surfaces) of the evaporator. In order to hold the curves surfaces into a fixed position once they have been moved to a desired position, a clip can be used to secure the outside edges of two adjacent overlapping curved surfaces to one another.

In order to address the issue of service lines which can make it difficult to place a continuous curved surface around the evaporator, or where the evaporator is located close to a structure so that a full continuous dish shape can be used, one or more of the adjacent curved panels can be eliminated to leave a "gap" in the collective surface for the service lines. Also, the hinge ring can be an open ring (i.e., a ring with a gap in the defining structure), allowing the solar reflector to be "slid" into place.

A third embodiment of the present invention provides for a modified evaporator in a heat pump system. The evaporator has a curved, reflective surface configured to reflect solar radiation to heat transfer plates in the evaporator. The evaporator can be defined by an outer perimeter, and further the curved surface can be configured to fit around the evaporator in proximity to the outer perimeter. Further, the evaporator outer perimeter and the curved surface can define a gap there between. This gap can allow rain and melting snow, and small debris, to pass between the curved surface and the evaporator, rather than allowing it to accumulate in the bottom of the curved surface.

A fourth embodiment of the present invention provides a method for improving the performance of an evaporator in a heat pump. The evaporator has heat transfer plates, and is (preferably) located in an outdoor environment. The method includes the steps of focusing solar radiation, and directing the focused solar radiation at the heat transfer plates in the evaporator. This focusing and directing can be performed using the solar reflectors described above. Further, when the heat pump is used to heat the indoor space of an associated building having a plurality of sides, and a first side of the building is exposed to more direct solar radiation during the winter season than another side of the building, the method can include locating the evaporator proximate to the first side of the building. This places the evaporator in a location where solar radiation can more easily be focused and directed to the heat transfer plates.

These and other aspects and embodiments of the present invention will now be described in detail with reference to the accompanying drawings, wherein:

DETAILED DESCRIPTION OF THE INVENTION

I have discovered that additional energy can be input into refrigerant passing through an evaporator in a heat pump system by directing focused solar radiation (or "solar energy") to the evaporator. This additional energy is then available to heat an indoor environmental space using the condenser of the heat pump. As described above, a heat pump has a heat exchanger located in the indoor environmental space, and an outdoor heat exchanger, which is typically located outside of the indoor space. When the heat pump is being used to heat the indoor environmental space, the outdoor heat exchanger acts as an evaporator, and the indoor heat exchanger acts as a condenser. The evaporator is typically provided with heat transfer plates or surfaces which facilitate the ability of the evaporator to absorb energy from the outdoor atmospheric air. I have found that by directing solar energy to these heat transfer plates, additional energy can be imparted to the refrigerant as it is circulated through the evaporator. Although in the absence of my invention the evaporator heat transfer plates may receive some incidental solar radiation as the sun moves through the sky, this incidental solar radiation is quite small as compared to the solar radiation that can be directed to the heat transfer plates using my invention.

Although in the following discussion I describe "focusing" solar radiation, it should be understood that the solar radiation does not need to be focuses to a single point. Rather, by "focusing" I mean concentrating solar radiation that would, in the absence of my invention, not otherwise be directed to the heat transfer plates of the evaporator. In my invention, after the solar radiation is concentrated, it is directed to the heat transfer plates of the evaporator.

The present invention can be used with most heat pump systems. However, for purposes of discussion only, I will refer to the heat pump evaporator installation shown in the exemplary drawing of FIG. 2, which was discussed above in the Background section. As described, in FIG. 2 the evaporator 10 of the heat pump is located proximate to the side of a structure (here, the house "H") which the heat pump is used to heat. It is desirable that the apparatus of the present invention be capable of being used with existing (previously installed) heat pump evaporators, as well as with new installations. Accordingly, the apparatus of the present invention can be configured to retrofit a prior installation of a heat pump evaporator, as will be described in more detail below.

Figure 3:
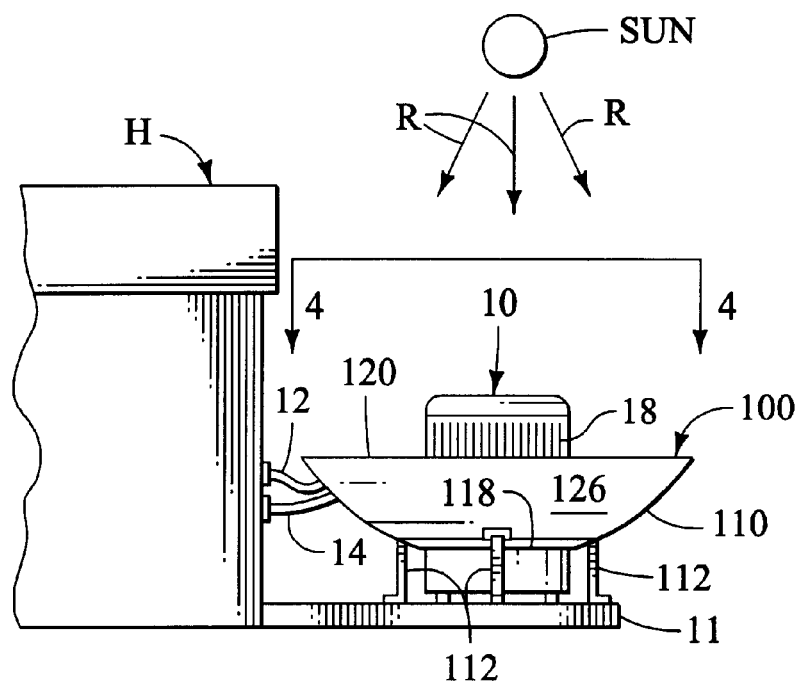
FIG. 3 is a side elevation view of a heat pump evaporator with a solar reflector in accordance with a first embodiment of the present invention.
Figure 4:
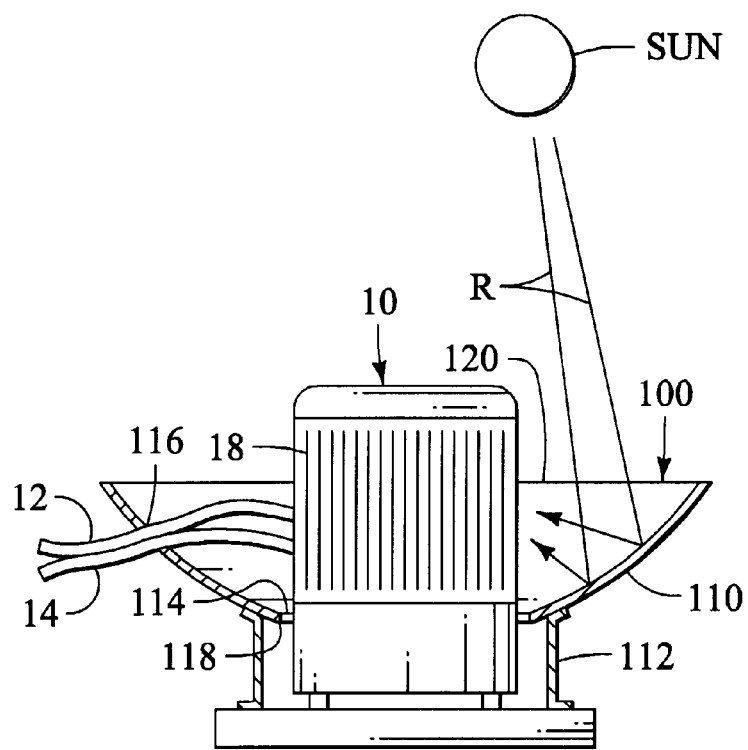
FIG. 4 is a side sectional view of the solar reflector depicted in FIG. 3.
Figure 5:
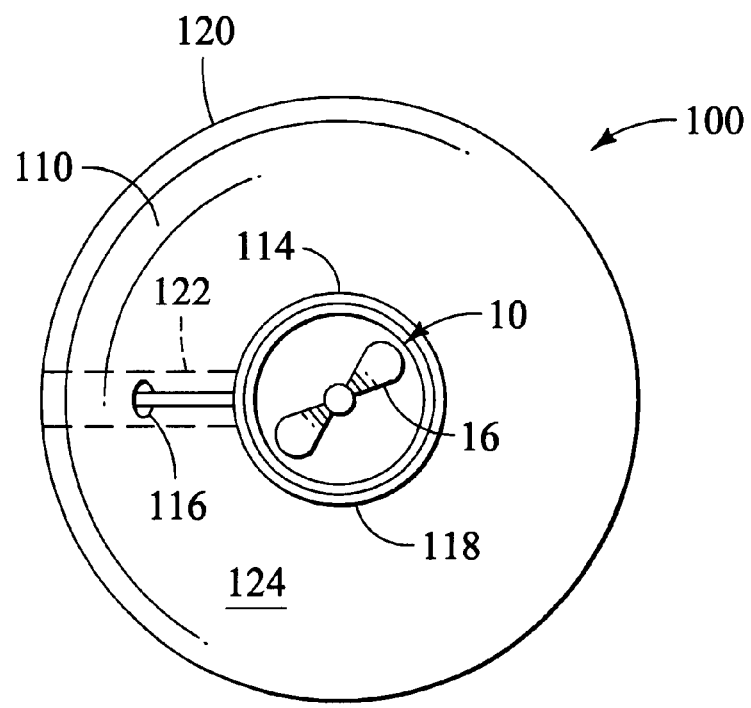
FIG. 5 is a plan view of the solar reflector depicted in FIG. 3.

Turning now to FIG. 3, an apparatus in accordance with a first embodiment of the present invention is depicted in a side elevation view. A plan view of the apparatus is depicted in FIG. 5, and a side sectional view of the apparatus is depicted in FIG. 4. In the following discussion, I will refer to these three figures collectively. The apparatus is a solar reflector 100 for an evaporator 10 in a heat pump system (not shown in entirety). The evaporator has heat transfer plates 18, and is located in an outdoor environment adjacent the structure "H". The solar reflector 100 comprises a curved surface 110 configured to reflect solar radiation "R" to the heat transfer plates of the evaporator. The curvature of the curved surface serves to focus the solar radiation "R" so that more solar energy can be imparted to the plates 18 than would be if just a flat reflective surface was used, as indicated by the rays "R" in FIG. 4. The solar reflector 100 can include support legs 112 which can support the reflector on a horizontal surface, such as slab 11.

The curved surface 110 defines an inner surface 124 (FIG. 5) and an outer surface 126 (FIG. 3). The inner surface is generally facing towards the evaporator 10. Preferably, the inner surface is a reflective surface, and more preferably a highly reflective surface. For example, when the curved surface is fabricated from metal such as stainless steel or aluminum, then the inner surface can be polished. A polished inner surface 124 will tend to enhance the performance of the solar reflector 100 since less solar radiation will be lost due to diffusion. That is, a polished inner surface will tend to ensure that solar radiation reflected from the inner surface 124 is directed to the heat transfer plates 18 of the evaporator 10.

In one variation the curved surface 110 is in the shape of a truncated parabola, as shown in FIG. 3. By "truncated" I mean that the apex, or "bottom", of the parabolic arc is removed. This provides an opening 114 allowing the solar reflector 100 to be placed over the evaporator 10 as depicted in FIG. 4. Although a parabolic curved shape is preferable due to its enhanced ability to focus and reflect solar radiation, other curved shapes can also be used which tend to concentrate or focus solar energy. Since the solar energy is to be directed towards the heat transfer plates 18, which are typically exposed at the perimeter of the evaporator over a vertical distance of at least 12 inches, it is not necessary that a precise focusing occur, and any curved surface which tends to concentrate the solar radiation and reflect it towards the heat transfer plates 18 can be used. For example, the curved surface can be a segment of a sphere. Therefore, generally the curved surface 110 is a dish-like shape defining an upper perimeter 120 and a lower perimeter 118 (see FIGS. 4 and 5). The lower perimeter 118 defines a bottom opening 114 configured to receive the evaporator 10 therein.

Figure 6:
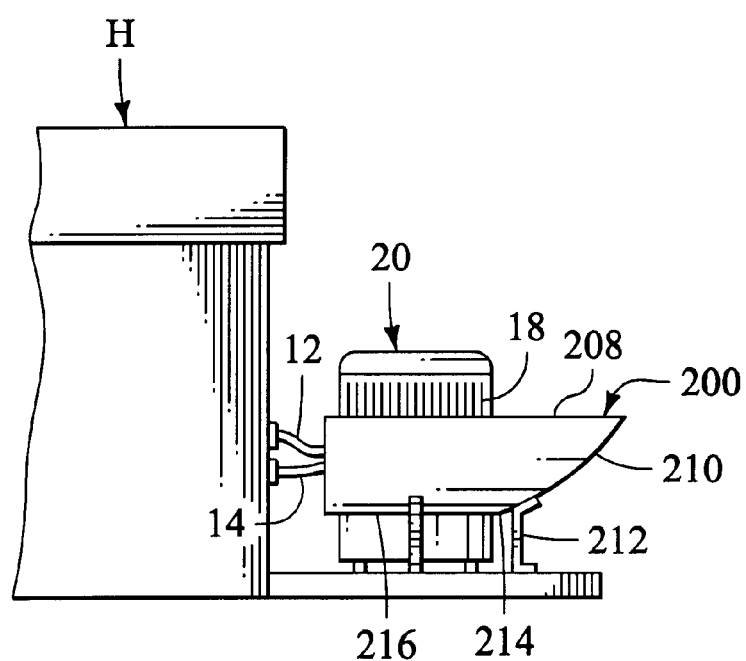
FIG. 6 is a side elevation view of a heat pump evaporator with a solar reflector in accordance with a variation on the first embodiment of the present invention.

When the solar reflector 100 is installed around the perimeter of the evaporator 10, as depicted in FIG. 6, then the evaporator 10 and the opening 114 (defined by the lower perimeter 118) preferably define a gap there between. This gap can allow rain, melted snow, and small debris to pass from the curved surface 10 to the support platform 11. In the absence of the gap, water and debris can more easily accumulate in the curved surface, affecting the performance of the solar reflector 100, and also potentially the performance of the evaporator 10. As an alternative to (or in addition to) the gap, holes (not shown) can be formed in the lower part of the curved surface 110 to allow water and debris to pass out of the curved surface.

Figure 2:
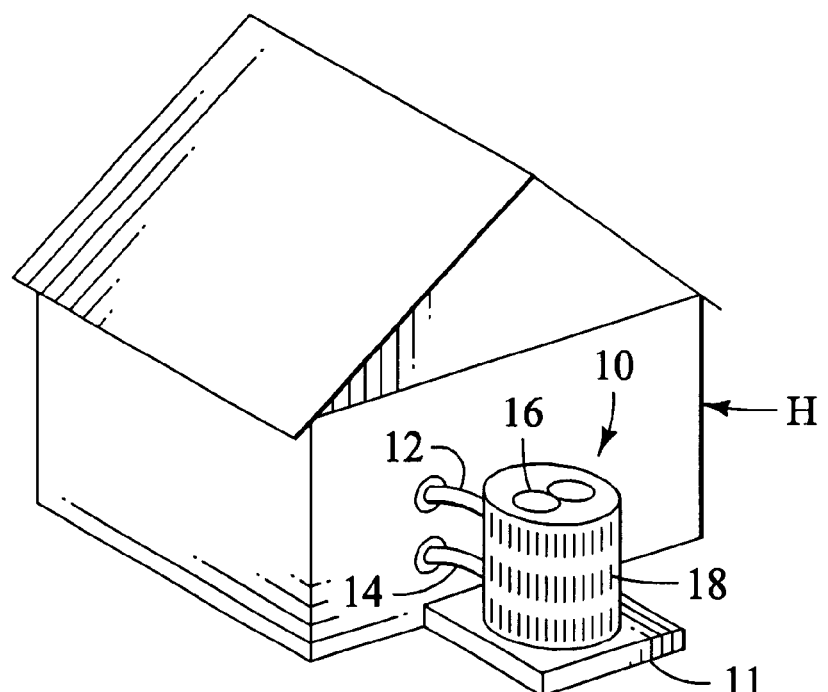
FIG. 2 is an oblique diagram depicting a typical heat pump evaporator installation in a residential setting.

As shown in FIG. 5, the upper perimeter 120 of the curved surface 110 forms a continuous circle. Such a configuration maximizes the reflective area of the solar reflector 100 which can be used to direct solar radiation to the heat transfer plates of the evaporator. However, in certain evaporator installations (as shown in FIG. 2) the evaporator can have one or more of a refrigerant supply line 12, a refrigerant return line 14, and an electrical power line (not shown), any or all of which may interfere with placing a continuous reflective surface around the evaporator. One solution to this problem is to provide the reflective surface 110 with an opening 116 (as shown in FIGS. 4 and 5) allowing any or all of the supply lines to pass there through. Such a configuration minimizes the loss of reflective surface area of the curved surface 110. However, such a configuration can require the service lines to be temporarily disconnected and reconnected to install the solar reflector 100. It is desirable that the solar reflector be capable of being easily installed and removed so that when the outdoor heat exchanger is operating as a condenser, (i.e., the indoor environmental space is being cooled), the apparatus can be removed to prevent heat from being added to the refrigerant in the condenser by the solar reflector 100. Accordingly, an alternate solution to the problem of interfering services lines is to configure the reflective surface 110 such that the upper perimeter 120 and the lower perimeter 118 each form a partial circle to thereby define a gap 122 (shown in dashed lines) in the curved surface 110. The gap 122 is configured to receive at least one of the services lines. This allows for easy installation and removal of the solar reflector 110.

Figure 7:
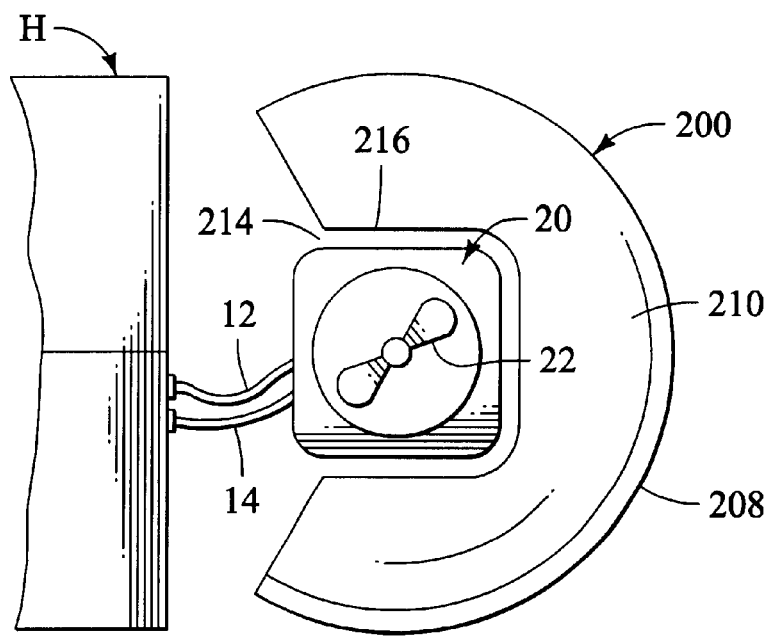
FIG. 7 is a plan view of the solar reflector depicted in FIG. 6.

Although FIG. 5 depicts an evaporator 10 which is round in a plan view, in some installations the evaporator is square or rectangular in a plan view. Further, while FIG. 3 depicts an evaporator 10 which is located a sufficient distance from the structure "H" that a full dish-shaped solar reflector 100 can be placed around the evaporator, in some installations the evaporator is located too close to the structure to allow an effective full dish-shaped solar reflector to be used. Both of these scenarios are depicted in FIGS. 6 and 7, along with a solar reflector 200 in accordance with the present invention. The solar reflector 200 address both of these issues— i.e., a non-round evaporator, and an evaporator located close to a structure. FIG. 6 is a side elevation view of an evaporator 20 used to service a structure H", and FIG. 7 is a plan view of FIG. 6. The solar reflector 200 includes a curved surface 210 which is defined by an upper perimeter 208 and a lower perimeter 216. The curved surface 210 is supported by legs 212. As can be seen in FIG. 7, the upper perimeter 208 forms a partial circle, and the lower perimeter 216 defines three sides of a rectangular opening 214. The rectangular opening is configured to receive the evaporator 20, and allows the solar reflector to be installed by "slipping" it in place from the front of the evaporator (rather than being dropped over the evaporator from the top). Further, the partial circle of the upper perimeter 208 allows the curved surface 210 to fit around the perimeter of the evaporator 20 without the structure "H" interfering with the solar reflector 200. This configuration also addresses any problems which might be caused by the presence of service lines 12 and 14.

Figure 8:
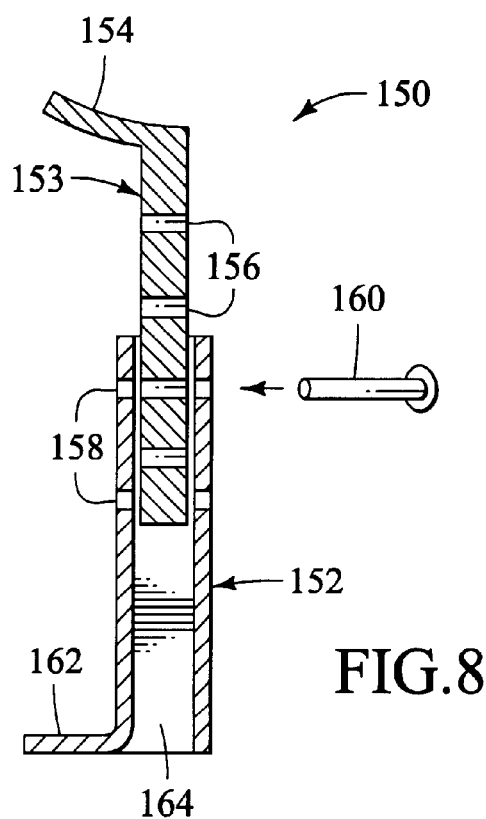
FIG. 8 is a side sectional view of an adjustable leg which can be used with the solar reflector of the present invention.

As previously mentioned, a solar reflector in accordance with the present invention can be used with pre-existing heat pump evaporator installations. Since there are a number of different sizes and shapes of evaporators, it is desirable to provide a solar reflector that can be adjusted to accommodate a variety of different evaporators. One way in which evaporators can vary from one to another is in the height at which the heat transfer plates 18 are located from the horizontal support surface (11 of FIG. 2). One way to accommodate this variance in height of the heat transfer plates is to allow the legs which support the curved surface to be adjustable in height. Turning to FIG. 8, to one configuration for providing an adjustable-height support leg is shown. The support leg 150 is shown in a sectional side elevation view. The adjustable leg 150 includes a bottom portion 152 having a foot 162 to facilitate support and stabilization of the solar reflector. The lower portion 152 of the leg 150 defines an opening 164. The leg 150 further includes an upper portion 153 which is configured to freely slide within the opening 164 in the lower portion, and thus allow the leg 150 to be adjustable in height. The upper portion 153 includes a support arm 154, used to support the curves surface of the solar reflector. The upper portion 153 can have upper holes 156 formed therein, and the lower portion 152 can have lower holes 158 formed therein. By aligning one of the upper holes 156 with one of the lower holes 158, and then inserting a locking member (such as pin 160, or a bolt) through the aligned holes, the adjustable leg can be held in a fixed position, thus fixing the supported curved surface in a fixed position. Accordingly, the vertical position of the curved surface can adjusted to optimize its effect in reflecting solar radiation to the heat transfer plates of the evaporator.

Figure 9:
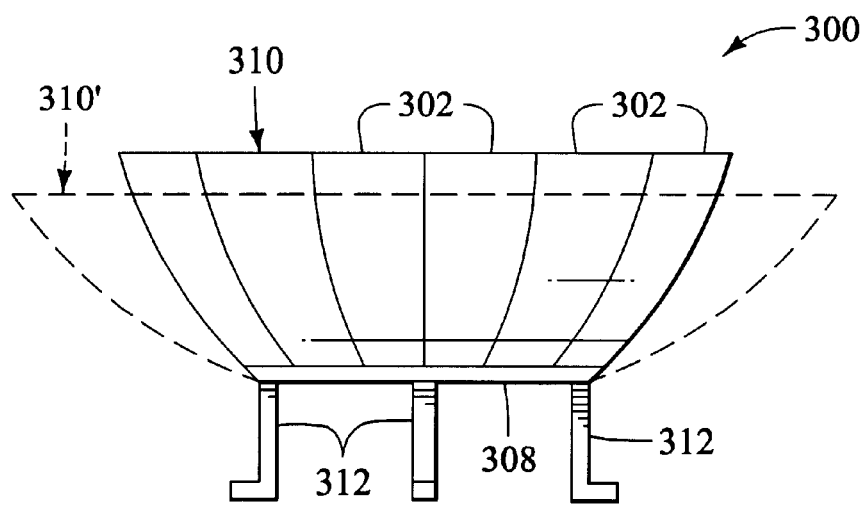
FIG. 9 is a side elevation view of a solar reflector for a heat pump evaporator in accordance with a second embodiment of the present invention.

Turning to FIG. 9, a solar reflector 300 in accordance with a second embodiment of the present invention is shown in a side elevation view. The solar reflector 300 is also depicted in plan view in FIG. 10. The solar reflector is configured to be used with an evaporator in a heat pump system, similar to the arrangement depicted in FIG. 3. As with the first embodiment of the invention, the evaporator is understood to have heat transfer plates, and is preferably located in an outdoor environment. The evaporator is not shown in FIGS. 9 and 10, but can be similar to the heat pump 10 depicted in FIG. 3. The solar reflector 300 of FIGS. 9 and 10 addresses the situation mentioned above, that is, of being able to accommodate a variety of different evaporator types.

Figure 10:
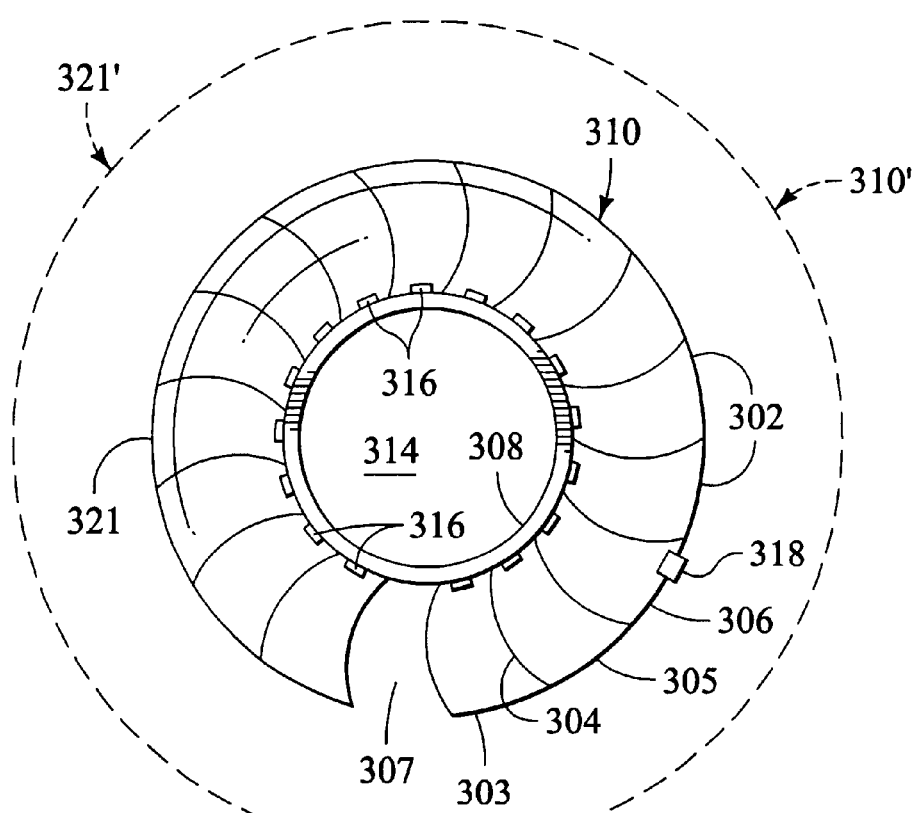
FIG. 10 is a plan view of the solar reflector of FIG. 9.

The solar reflector 300 includes a plurality of curved surfaces 302, each being configured to reflect solar radiation to the heat transfer plates of an evaporator. The solar reflector 300 also includes a hinge ring 308. The hinge ring 308 defines an opening 314 configured to receive an evaporator. Each of the curved surfaces 302 are hingedly attached to the hinge ring by hinges 316 (FIG. 10). Further, the plurality of curved surfaces 302 partially overlap one another. That is, viewing FIG. 10, the trailing edge 304 of curved surface 303 partially overlaps curved surface 305, curved surface 305 partially overlaps curved surface 306, and so on around the entire periphery of the solar reflector 300. Accordingly, when one of the curved surfaces 302 is moved about the hinge 316 which attaches that curved surface to the hinge ring 108, the other curved surfaces will also be caused to move about their respective hinges, due to the overlapping configuration of the curved surfaces. Thus, the curved surface can be reconfigured from a first position shown as item 310, to a second position shown by the dashed lines and indicated as item 310'. In this way the shape of the overall curved surface, which is defined by the overlapping individual curved surfaces 302, can be changed to selectively focus and direct solar radiation to the heat transfer plates of an evaporator.

In order to hold the collective plurality of curved surfaces 302 into a fixed position once they have been adjusted as desired, a clip 318 or the like can be used to secure the outside edges 321 of two adjacent overlapping curved surfaces 302 to one another.

As depicted in FIG. 9, the individual curved surfaces 302 can collectively define a continuous curved surface, which can be in the shape of a truncated parabolic dish, similar to the truncated parabolic dish described with respect to the curved surface 110 of FIG. 3. Further, to address the situation of possibly interfering services lines, as discussed above, one or more adjacent individual curved surfaces can be eliminated. This defines a gap 307, as depicted in FIG. 10, through which the service lines can be passed. In this case the curved surfaces 302 collectively define an open ring-shaped curved surface. That is, the ring is formed by the collective curved surfaces 302 and the opening 314, and it is considered an "open ring" by virtue of opening or gap 307.

Figure 1:
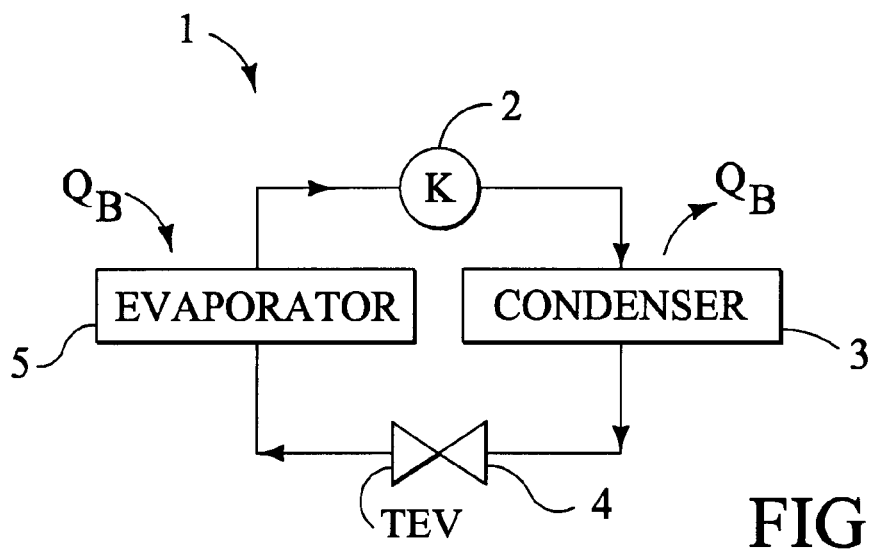
FIG. 1 is a simplified schematic diagram of a prior art heat pump system for warming the air in an indoor environmental space.

A third embodiment of the present invention is also shown by FIG. 3. In this embodiment the invention includes an evaporator (similar to evaporator 10) which can be used in a heat pump system (not shown in FIG. 3, but similar to the heat pump system 1 of FIG. 1). The evaporator includes a plurality of heat transfer plates 18, and a curved, reflective surface 110 configured to reflect solar radiation "R" to the heat transfer plates 18. Preferably, the curved surface 110 focuses the reflected solar radiation "R" towards the heat transfer plates. The evaporator can be defined by an outer perimeter (i.e., the outside edge of the evaporator when viewed in a plan view), and the curved surface 110 can be configured to fit around the evaporator in proximity to the outer perimeter of the evaporator, in the manner shown in FIG. 3.

Figure 11:
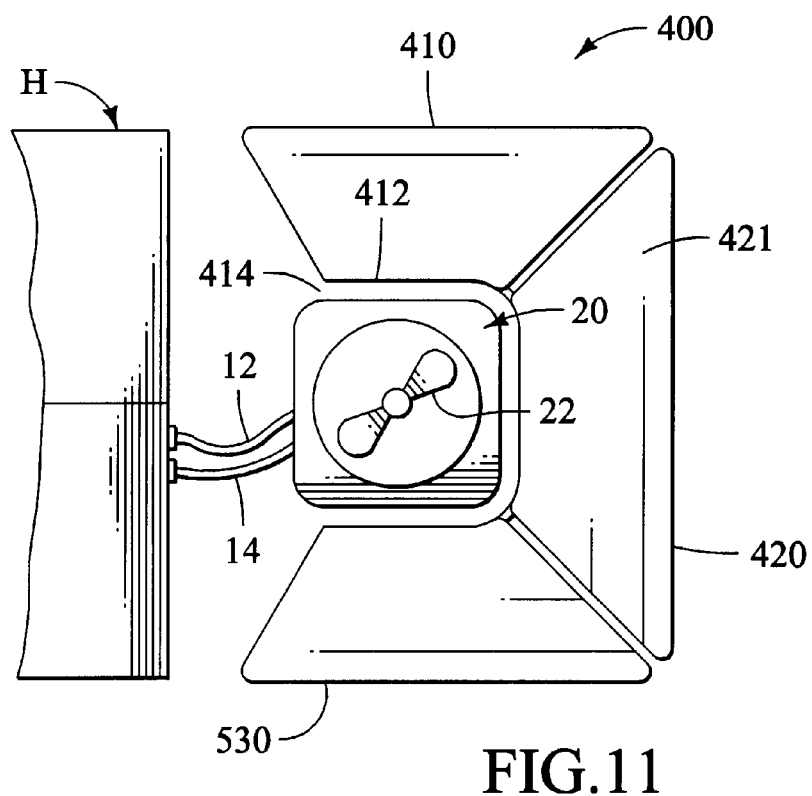
FIG. 11 is a plan view of a heat pump evaporator with a solar reflector in accordance with another embodiment of the present invention.
Figure 12:
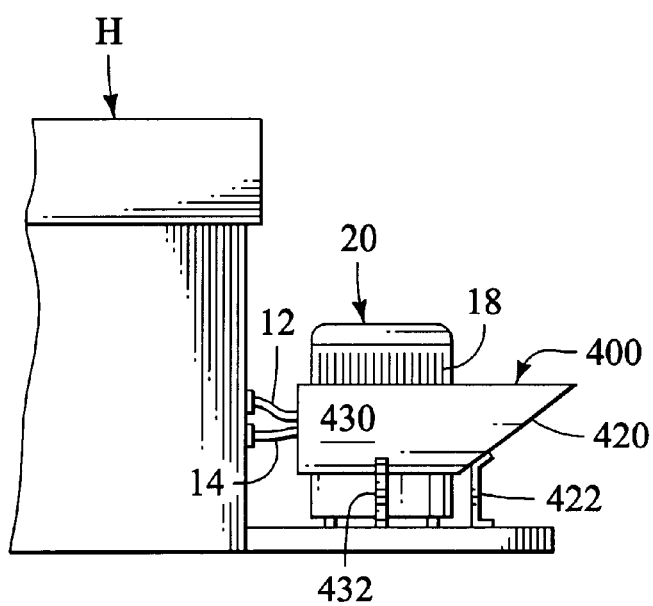
FIG. 12 is a side elevation view of the heap pump evaporator and solar reflector of FIG. 11.

Yet another embodiment of an apparatus in accordance with the present invention is depicted in FIGS. 11 and 12. FIG. 11 depicts a plan view of a heat pump evaporator 20, as described above, in conjunction with a solar reflector 400 in accordance with the present invention. The evaporator 20 and the solar reflector 400 are depicted in FIG. 12 in a side elevation view. With respect to FIG. 11, the solar reflector 400 comprises a plurality of reflective surfaces 410, 420 and 430. The reflective surfaces need not be curved, and in fact can be flat surfaces. The reflective surfaces are positioned to as to reflect solar radiation towards the heat transfer surfaces 18 of the heat pump evaporator 20. As depicted, the reflective surfaces 410, 420 and 430 are positioned in three locations around the perimeter of the heat pump evaporator 20, preferably leaving a gap between the reflective surfaces and the evaporator, as shown by the exemplary gap 414 which is defined between the evaporator 20 and the inner perimeter 412 of reflective panel 410. However, other configurations can be used to equal effect, so long as the reflective surfaces are positioned to reflect solar radiation towards the heat transfer surfaces 18 of the heat pump evaporator 20. This concept is equally applicable to the use of a curved reflective surface. As shown in FIG. 12, reflective panel 430 is supported by leg 432, and reflective panel 420 is supported by leg 422.

A fourth embodiment of the present invention provides a method for improving the performance of an evaporator in a heat pump. The evaporator can be similar to evaporator 10 of FIG. 3, and the heat pump can be similar to the heat pump system 1 of FIG. 1. The evaporator has heat transfer plates (as described above with respect to evaporator 10), and is preferably located in an outdoor environment. The method includes the steps of directing solar radiation towards the heat transfer plates of the evaporator. Preferably, the solar radiation is first focused, and the focused solar radiation is then directed towards the heat transfer plates. The focusing does not need to be precise focusing to a particular point or line on the heat transfer plates, and is preferably to an area along the edge of the heat trasfer plates to thus more evenly distribute the solar energy. The focusing of the solar radiation, and directing the solar radiation to the heat transfer plates, can be performed using any one of the solar reflectors 100 (FIG. 3), 200 (FIG. 6), 300 (FIG. 9), or 400 (FIG. 11) described above, as well as other apparatus.

For a new installation of a heat pump evaporator, particular advantage can be made of the method of the present invention by favorably positioning the evaporator. For example, when the heat pump is used to heat an indoor space of an associated building, a first side of the building can be exposed to more direct solar radiation during the winter season than another side of the building, merely by virtue of the placement of the building. The method can therefore further include locating the evaporator proximate to this first side of the building so that more solar radiation is available to be focused and directed towards the heat transfer plates of the evaporator.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A solar reflector for an evaporator in a heat pump system, the evaporator having heat transfer plates and being located in an outdoor environment, the solar reflector comprising a curved surface configured to reflect solar radiation to the heat transfer plates of the evaporator, and wherein the surface is curved in a dish-like shape defining an upper perimeter and a lower perimeter, the lower perimeter defining a bottom opening configured to receive the evaporator therein.

2. The solar reflector of claim 1, and wherein:

the evaporator is provided with a refrigerant supply line and a refrigerant return line; and the upper and lower perimeters each form a partial circle to thereby define a gap in the curved surface, the gap being configured to receive at least one of the refrigerant supply line or the refrigerant return line.

3. The solar reflector of claim 1, and wherein the upper perimeter forms a partial circle and the lower perimeter defines three sides of a rectangular opening, the rectangular opening configured to receive the evaporator.

* * * * *